UNITED STATES PATENT OFFICE 2,584,334

DIPHENYL AND PHENYL ORTHOSILICATES

Ettore Da Fano, Raritan, N. J., assignor to John B. Pierce Foundation, New York, N. Y., a corporation of New York No Drawing. Application June 10, 1950, Serial No. 167,496

3 Claims. (Cl. 260—448.8)

This invention relates to the preparation of heat transfer fluids and to certain fluid compositions of diphenyl and phenyl orthosilicates and mixed diphenyl phenyl orthosilicates.

Tetraphenyl and tetracresyl orthosilicates and mixtures thereof have been proposed as heat transfer fluids by virtue of their relatively high boiling points. Mixtures containing tetracresyl orthosilicate and tetraphenyl orthosilicate have been recommended and used for this purpose.

Pure tetracresyl orthosilicate or mixtures thereof with tetraphenyl orthosilicate do not possess satisfactory stability at high temperatures. When they are subjected to temperatures of the order of 700° F., over a normally long period of use, even in a closed system wherefrom neither liquid nor vapor can escape, nor air, moisture or impurities enter, objectionable amounts of decomposition products are formed. These include free phenol, free cresol, polymeric silicates, benzene, toluene, xylenes, low boiling aliphatic hydrocarbons, crystalline anthracene-type hydrocarbons, and solid resin polymers. Pure tetraphenyl orthosilicate does not show such a pronounced tendency to decompose at elevated temperatures. Its use, however, is limited by its high melting point (122° F.) at which temperature it becomes a crystalline solid, and by its relatively low boiling point, which is about 766° F. Such a low boiling point does not provide a safe enough margin of operation at temperatures over 600° F., and such a high melting point is especially undesirable in a liquid system which often goes down to room temperature.

In order to raise the boiling point and lower the melting point, it has been proposed to add tetracresyl silicate to tetraphenyl silicate. The patent literature recommends a mixture having 20% tetracresyl silicate, but commercial experience showed that this does not depress the melting point sufficiently and all commercial mixtures with which I am familiar contain approximately 40% tetracresyl silicate. These mixtures have a satisfactory low melting point, but the presence of tetracresyl silicate, however, greatly aggravates the decomposition problem, as explained previously. Mixtures containing tetracresyl silicate in the above mentioned amounts are unsatisfactory because of decomposition at elevated temperatures, particularly in the range of 600 to 700° F.

It is thus apparent that a need exists for a heat transfer fluid which is a liquid of suitable viscosity at low temperatures and which is also useful at temperatures of about 700° F. without danger of decomposition. It is an object of this invention, therefore, to meet this need.

In accordance with this invention, heat transfer fluid compositions are prepared which are exceptionally stable and are also characterized by boiling points as high as about 950° F. and at least 825° F., by very low freezing points, and by satisfactory viscosities at low and high temperatures. These compositions comprise as their principal components a mixture of diphenyl, phenyl and mixed diphenyl phenyl orthosilicates within the general empirical formula:

$$(C_{12}H_9O)_x(C_6H_5O)_{4-x}Si$$

where $x$ is a number from 0.4 to about 3.6. When $x$ is substantially less than about 0.4 the material will partially crystallize at room temperature. The upper limit of 3.6 is dictated by practical considerations since known methods do not readily produce a material with a higher proportion of the diphenyl radical.

When a mixture containing diphenyl and phenyl orthosilicates within the above indicated proportions is heated to an elevated temperature, within the range of 400° to 500° F. for a few hours, or to a lower temperature in the presence of a catalyst, an equilibrium is set up among the five possible orthosilicates:

1. Tetra(diphenyl) orthosilicate

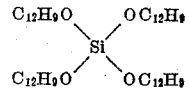

2. Tri(diphenyl) monophenyl orthosilicate

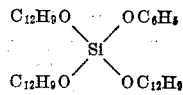

3. Di(diphenyl) diphenyl orthosilicate

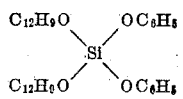

4. Mono(diphenyl) triphenyl orthosilicate

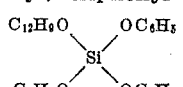

5. Tetraphenyl orthosilicate

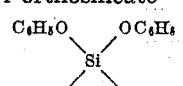

The equilibrium mixture thereby obtained will contain varying proportions of the above-listed components, depending upon the ratio of diphenyl to phenyl radicals in the starting mixture within the limits indicated heretofore. Equilibrium mixtures of any desired ratio of components may therefore be made, on the basis of the ratio of the original two reactants.

This equilibrium is established regardless of the methods and starting materials used to prepare the composition. If, for example, the composition of the invention is prepared from tetra(diphenyl) orthosilicate and tetraphenyl orthosilicate, the equilibrium is set up by disproportionation. The composition may also be made by reacting silicon tetrachloride with phenol and phenylphenol, in which event equilibrium is established in the natural course of the synthesis. Similarly, the equilibrium is established when tetraphenyl orthosilicate is reacted with a calculated amount of phenylphenol to displace an equal molecular amount of phenol or vice-versa.

It will therefore be understood that the term equilibrium mixture as used herein is intended to mean the five component mixtures obtained by any of the above processes, containing a ratio of diphenyl to phenyl radicals within the limits specified.

In general, the higher the proportion of diphenyl radicals, the higher is the boiling point and the higher is the viscosity at low temperatures. Therefore, the ratio of the total number of diphenyl radicals (based on their gram radical weights) to the total number of phenyl radicals (based on their gram radical weights) in the mixture of orthosilicates of the composition is chosen so that the composition has the desired boiling point and low viscosity, depending on particular requirements within the range explained heretofore. The usual requirements dictate a preference for a mixture in which the amount of the diphenyl radical is not more than the phenyl radical on a molal basis.

The following proportions of total diphenyl and total phenyl radicals in a mixture of the orthosilicates fall within the requirements of the invention and are found to have the desired melting points, viscosities, boiling points, and stability at elevated temperatures:

*Ratio of radicals per silicate group (based on their gram radical weights)*

| No. | Diphenyl | Phenyl | Molecular Weight |
|---|---|---|---|
| 1 | 0.4 | 3.6 | 449.2 |
| 2 | 1 | 3 | 476.6 |
| 3 | 1.8 | 2.2 | 536.0 |
| 4 | 2 | 2 | 552.7 |
| 5 | 2.85 | 1.15 | 620.1 |
| 6 | 3 | 1 | 628.8 |
| 7 | 3.6 | 0.4 | 673.5 |

The boiling points, flash points, fire points, and viscosities of the above typical compositions are given in the following tables, wherein they are compared with the known tetraphenyl silicate:

| No. | Initial Boiling Point °F. (760 mm.) | Flash Point °F. | Fire Point °F. |
|---|---|---|---|
| Tetraphenyl orthosilicate | 766 | 475 | 540 |
| 1 | 869 | 505 | 580 |
| 2 | 918 | 530 | 610 |
| 3 | 959 | 565 | 655 |
| 4 | 955 | 575 | 620 |
| 5 | 981 | 620 | 730 |
| 6 | 984 | 630 | 740 |
| 7 | 988 | 670 | 970 |

Tetraphenyl orthosilicate is a pure compound, and therefore has a sharp freezing point of 122° F. and no cloud point indicating incipient crystallization as in certain other silicates.

Compositions Nos. 1 to 7 on cooling become increasingly viscous, but no clouding or freezing has been observed which would indicate crystallization over the temperature range to which the materials would normally be subjected.

*Viscosity centistokes[1]*

| No. | 20° F. | 32° F. | 50° F. | 77° F. | 100° F. | 130° F. | 160° F. | 185° F |
|---|---|---|---|---|---|---|---|---|
| 1 | 6,997 | 1,617 | 314.3 | 93.5 | 42.9 | 19.9 | 11.28 | 7.76 |
| 2 | | | 1,300 | 220 | 75 | 33 | 16.9 | 11.1 |
| 3 | | | 9,925 | 833 | 210.5 | 72.0 | 31.4 | 18.7 |
| 4 | | | | 1,580 | 330 | 89 | 37.5 | 21.9 |
| 5 | | | | 19,900 | 1,948 | 294.7 | 88.5 | 43.2 |
| 6 | | | | 30,000 | | 400 | 110 | 51 |
| 7 | | | | | | 1,887 | 313.7 | 115.7 |

[1] Where no value is given the measurement was not taken or else the viscosity was too high to measure by the method used.

It will be seen from the tables that compositions having a variety of boiling points, flash points, fire points, and viscosities may be prepared by adjusting the ratio of diphenyl and phenyl radicals within the general range indicated.

In order to determine relative heat stability, a composition made in accordance with this invention was tested alongside a commercial prior art composition. The latter comprised the equilibrium mixture of 60% tetraphenyl orthosilicate and 40% tetracresyl orthosilicate. The latter mixture was heated at a temperature of 700° F. for 100 days under reflux. Decomposition started in at once and was progressive. After heating for 100 days, the composition was analyzed and was found to contain 20% volatiles boiling under 700° F. These comprised phenol, cresols and combustible hydrocarbons such as benzene, toluene and xylene. The heated composition also comprised 40% of a solid polymer soluble in the liquid silicate. The presence of the solid polymer was established by distilling the tetra-aryl silicates from the undistillable polymer, and also by noting the marked increase in viscosity of the material after the volatiles had been distilled off as compared with the viscosity of the starting material. The material had a viscous syrupy consistency and was almost black in color.

In contrast therewith, a composition was made in accordance with my invention comprising the equilibrium mixture of one molal part of tetradiphenyl orthosilicate and 3 molal parts of tetraphenyl orthosilicate. (Example 2 in the above tables). This composition was subjected to the same test, namely, heating at 700° F. for 100 days under reflux. The composition showed only 3% volatiles distilling under 700° F., and a large portion of this was traced to the presence of impurities in the technical grade of the phenylphenol used in preparing the composition. The decomposition took place early in the heating period, showing that any tendency to decompose levels off as soon as the impurities decompose. No polymer was formed as shown by the fact that there was no increase in viscosity or other changes in physical properties, and the liquid also remained a light color during and after the test.

In order to compare the heat stability of a composition containing 80% tetraphenyl orthosilicate and 20% tetracresyl orthosilicate (the composition recommended in the patent literature) with a mixture containing 80% tetraphenyl orthosilicate and 20% tetradiphenyl orthosilicate (all parts by weight), the above compositions were similarly heated at 700° F. for two weeks. The test was not continued longer because the final outcome could be predicted from the results obtained during this time. At the end of this period, a substantial proportion of the first liquid had decomposed, liberating benzene, toluene and xylene. Within a day the liquid had started boiling rather vigorously and continued to boil throughout the period. The second composition in accordance with the invention did not boil at any time during the test, nor were any low-boiling materials formed. No loss of material could be detected. Other compositions made in accordance with the invention show similar advantages with reference to heat stability.

In the compositions above tested the diphenyl radical is the ortho isomer, which is the most readily available and which was selected as illustrating the best mode of practicing my invention. The other isomers may be used or mixtures of them.

The above data shows the superior properties of compositions made in accordance with this invention, both as to their physical properties and their heat stability. While they have been compared with tetraphenyl orthosilicate modified with tetracresyl orthosilicate, they compare just as favorably with tetraphenyl orthosilicate modified by other alkylated aryl silicates, alkyl silicates, napththyl silicate, etc.

Many methods may be employed for preparing the compositions in accordance with the invention. Three satisfactory methods are:

(1) Direct synthesis from the corresponding phenylphenol, phenol and silicon tetrachloride,
(2) Phenolysis by displacement of phenyl or diphenyl radicals from tetraphenyl orthosilicate or tetra(diphenyl) orthosilicate respectively with the phenylphenol or phenol respectively.
(3) Transesterification of tetraphenyl orthosilicate and tetra(diphenyl) orthosilicate.

In the first procedure, the phenylphenol and phenol are reacted with silicon tetrachloride in the desired proportions, preferably using an excess of the phenols. The silicon tetrachloride is added rapidly to the phenol mixture with agitation. The rate of addition of silicon tetrachloride is regulated so that the rate of evolution of hydrogen chloride gas is fairly rapid, but not in such volume that unreacted silicon tetrachloride is entrained therewith. After all the silicon tetrachloride has been added, the reaction mixture is heated in the range of 440 to 510° F. to complete the reaction, drive off residual hydrogen chloride, and to strip excess unreacted phenols therefrom.

When the reaction mixture contains up to two moles of o-phenylphenol, the phenol mixture has a comparatively low melting point, and the silicon tetrachloride may therefore be combined with the melt. With reaction mixtures containing more than two moles of phenylphenol it may be necessary to employ a solvent, such as toluene, benzene or xylene, in order to facilitate reaction of the silicon tetrachloride therewith. If a solvent is employed, it is necessary to remove the solvent before reaction is complete in order to make it possible to heat the reaction mixture to the necessary temperature.

The reactants may be pure, or technical grade materials may be used. The phenol may contain up to 2½% water, and in this case silicate polymers may be formed, but their presence does not seem to be harmful since they do not materially affect the stability of the reaction mixture, and moreover, tend to lower the freezing point thereof.

The following general method may be used for preparing Examples 1 to 7. The equipment consists of a mechanically-agitated reactor which can be heated at will, an adequate condenser or system of condensers suitable for both reflux and distillation, an acid absorbing trap, an alcohol trap to absorb and react with any entrained silicon tetrachloride, a system of drying towers to prevent moisture from entering the reaction chamber, and a means of adding silicon tetrachloride.

The reaction vessel is charged with phenylphenol and phenol and the mixture is agitated to insure the thorough mixture of the phenols. The condenser is now connected for reflux to the acid absorber through the alcohol trap which contains a 10% excess of the combined weights of the phenol. The drying towers are placed so that no moisture can enter the system from the alcohol trap to the silicon tetrachloride addition container. The silicon tetrachloride is then added rapidly.

When the silicon tetrachloride has all been added, the reaction mixture is brought slowly to about 440 to 450° F. to expel all hydrochloric acid. The reaction mixture is allowed to reflux for at least 10 hours, but preferably longer, at 500 to 510° F. until reaction is complete.

The condenser is now arranged for distillation, and the unreacted phenolic materials are stripped off, first at atmospheric pressure and then under reduced pressure. The mixture is then blown with inert gas, such as nitrogen, to remove all traces of hydrogen chloride. The reactor is allowed to cool, and the desired product is recovered.

The phenylphenol seems to react more slowly than the phenol, especially when the phenylphenol is reacted with the last chlorine to be replaced on the silicon tetrachloride starting material. It is preferred, therefore, to react the phenylphenol with the silicon tetrachloride first. In a composition made from about one mol of phenylphenol and about 3 mols of phenol, the procedure described above is employed except that all of the phenylphenol is reacted with a stoichiometric excess of the silicon tetrachloride, for example, about ½ mol, following which the phenol is added and pre-reacted, then the balance of the silicon tetrachloride is added, and the reaction mixture finished according to the procedure explained above.

Synthesis by phenolysis is based upon the fact that when a tetraphenyl orthosilicate is heated in the presence of a phenylphenol, or vice versa, the phenylphenol will displace an equivalent amount of phenyl radicals from the silicate. In this procedure the tetraphenyl or diphenyl orthosilicate and phenylphenol or phenol, respectively, are mixed and heated together under reflux at temperatures up to about 470° F. for from 10 to 15 hours. The phenol which is liberated is then distilled. During this distillation the temperature is gradually increased to about 525° F. to 600° F. When phenol distillation at atmospheric pressure has ceased, the distillation is continued under reduced pressure until complete.

When the composition of the invention is prepared by transesterification, tetraphenyl orthosilicate and tetra(diphenyl) orthosilicate are mixed and heated at a temperature in the range of 440 to 600° F. The time required for the reaction to reach completion, i. e., to reach an equilibrium among all the possible phenyl(diphenyl) silicates, depends upon temperature. At 440 to 450° F. equilibrium is reached in about 24 hours or less.

The transesterification may be facilitated by addition of a catalyst. Satisfactory catalysts include compounds which contain chlorine linked directly to silicon and which readily decompose on contact with water, such as monochlorosilicates of isopropyl alcohol, isobutyl alcohol or phenol, analogous di- and trichloro silicates, or silicon oxychlorides such as hexachlorodisiloxane. After the reaction is complete, the catalyst may be removed by distillation.

It is important to note that the heat transfer liquid prepared by any of the above procedures is sufficiently pure and does not need to be distilled.

The new heat transfer fluids may be used advantageously in indirect heat transmitting contact with substances which it is desired to heat. They may, for example, be heated in any appropriate manner, conveyed to the liquid of the substances to be heated, and permitted to exchange heat therewith and then returned to the boiler for reheating.

All parts and percentages in the specification and claims are by weight unless indicated as molal.

I claim:

1. A composition having a high boiling point, low melting point and exceptional heat stability over long periods of time, consisting essentially of a mixture of phenyl orthosilicate, diphenyl orthosilicate and mixed phenyl diphenyl orthosilicates selected in such proportions within the range of 0.4 to 3.6 diphenyl radicals and 3.6 to 0.4 phenyl radicals for each silicate radical that the mixture has a viscosity adapting it for use as a heat transfer medium.

2. The composition of claim 1 in which diphenyl radical is the ortho isomer.

3. The method of preparing the composition of claim 1 which comprises first reacting an amount of phenylphenol within the range of 0.4 to 3.6 mols with silicon tetrachloride and then reacting an amount of phenol within the range of 3.6 to 0.4 mols with the reaction mixture and any necessary additional silicon tetrachloride, the total amount of phenylphenol and phenol being 4 mols for each mol of silicon tetrachloride, and heating the reaction mixture at a temperature of about 500° F. until the reaction is substantially completed.

ETTORE DA FANO.

REFERENCES CITED

The following references are of record in the file of this patent:

UNITED STATES PATENTS

| Number | Name | Date |
| --- | --- | --- |
| 2,335,012 | Johnston | Nov. 23, 1943 |